US006282647B1

(12) United States Patent
Leung et al.

(10) Patent No.: US 6,282,647 B1
(45) Date of Patent: Aug. 28, 2001

(54) METHOD FOR FLASHING A READ ONLY MEMORY (ROM) CHIP OF A HOST ADAPTER WITH UPDATED OPTION ROM BIOS CODE

(75) Inventors: Wendy Q. Leung, San Ramon; Nilesh R. Shah, San Jose, both of CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/324,347

(22) Filed: Jun. 2, 1999

(51) Int. Cl.[7] .............................. G06F 12/02; G06F 9/45; G06F 9/00; G06F 17/30; G11C 17/00
(52) U.S. Cl. .................................. 713/100; 713/2; 713/1; 710/1; 711/202; 711/201; 711/115; 711/159; 711/170; 709/221
(58) Field of Search ........................ 710/128, 1; 709/221; 711/202, 201, 159, 115, 170; 712/1; 713/2, 100, 1; 707/203; 365/104; 358/1.16

(56) References Cited

U.S. PATENT DOCUMENTS

| 5,142,667 | * | 8/1992 | Dimperio et al. ................... 358/1.16 |
| 5,167,030 | * | 11/1992 | Spilo .................................... 709/221 |
| 5,202,994 | * | 4/1993 | Begur et al. ......................... 711/202 |
| 5,301,328 | * | 4/1994 | Befur et al. .......................... 711/201 |
| 5,371,876 | * | 12/1994 | Ewertz et al. ....................... 711/159 |
| 5,418,918 |   | 5/1995 | Vander Kamp et al. ............ 395/375 |
| 5,487,161 | * | 1/1996 | Koenck et al. ....................... 711/115 |
| 5,579,522 | * | 11/1996 | Christeson et al. ....................... 713/2 |
| 5,694,600 |   | 12/1997 | Khenson et al. ..................... 395/652 |
| 5,757,690 | * | 5/1998 | McMahon ............................ 365/104 |
| 5,835,761 | * | 11/1998 | Ishii et al. ............................ 713/100 |
| 5,836,013 | * | 11/1999 | Greene et al. ........................... 713/2 |
| 5,841,991 | * | 11/1998 | Russell ................................. 709/221 |
| 5,854,937 | * | 12/1998 | Woodward .............................. 712/1 |

(List continued on next page.)

OTHER PUBLICATIONS

Ohmi et al. "Association Hardware for Intelligent Electronic Systems", Systems and Computers in Japan, V. 30, I. Nov. 12, 1999, pp. 52–62.*

Sudarsanam et al. "Simultaneous Reference Allocation in Code Generation for Dual Data Memory Bank ASIPs", ACM Trans. Des. Autom. Electron. Syst. 5, Apr. 2000, pp. 242–264.*

(List continued on next page.)

*Primary Examiner*—Thomas Lee
*Assistant Examiner*—Katharina Schuster
(74) *Attorney, Agent, or Firm*—Martine & Penilla, LLP

(57) ABSTRACT

A programming method for flashing a read only memory (ROM) chip of a host adapter with an updated BIOS code is provided. The host adapter is connected to a host computer system. The method includes building a table having start address information and memory size information of memory space occupied in the random access memory (RAM) of the host computer system by one or more PCI host adapters which are connected to the computer system via a PCI bus. The method then moves to identifying a selected PCI host adapter having a ROM chip. A desired amount of memory space for an updated option ROM code is then mapped between the RAM of the host computer system and the ROM chip. A start address in RAM of an additional PCI host adapter that is determined to lie within the desired amount of memory space is redirected. Preferably, the redirection is temporarily made to zero. The method now moves to loading the updated option ROM code into the desired amount of memory space in RAM and in the ROM chip of the selected host adapter. The preferred method also includes restoring the start address in RAM of the additional PCI host adapter after the loading of the updated option ROM code is complete. If there is more than one host adapter occupying space in the desired amount of memory space, each of the start addresses of those host adapters is also temporarily redirected to zero while the loading is performed.

25 Claims, 6 Drawing Sheets

U.S. PATENT DOCUMENTS

| | | | | |
|---|---|---|---|---|
| 5,878,238 | * | 3/1999 | Gan et al. | 710/128 |
| 5,930,829 | * | 7/1999 | Little | 711/170 |
| 5,960,445 | * | 9/1999 | Tamori et al. | 707/203 |
| 6,009,520 | * | 12/1999 | Gharda | 713/1 |
| 6,061,745 | * | 5/2000 | Mahmoud | 710/1 |

OTHER PUBLICATIONS

Kramer et al. "Ultra–Low–Power Analog Associative Memory Core Using Flash–EEPROM–Based Progammable Capacitors", Proceedings 1995 International Sym. on Low Power Design, pp. 203–208.*

Qiu et al. "Options for Dynamic Address Translation in COMAs", Proceedings of the 25th Annual International Symposium on Computer Architecture, 1998, pp. 214–225.*

Jerry Jex "Flash Memory BIOS for PC and Notebook Computers", Communications, Computers and Signal Processing, 1991., IEEE Pacific Rim Conference on, 1991, pp. 692–695 vol. 2.*

* cited by examiner

SELECTED
HA
↓

|  | HA$_1$ | HA$_2$ | HA$_3$ | HA$_4$ |
|---|---|---|---|---|
| START ADDRESS | SA$_1$ | SA$_2$ | SA$_3$ | SA$_4$ |
| SIZE | SIZE$_1$ | SIZE$_2$ | SIZE$_3$ | SIZE$_4$ |

FIG. 7A

SELECTED
HA
↓
— 302

|  | HA$_1$ | HA$_2$ | HA$_3$ | HA$_4$ |
|---|---|---|---|---|
| START ADDRESS | SA$_1$ | SA$_2$ | SA$_3$ | 0 |
| SIZE | SIZE$_1$ | SIZE$_2$ | SIZE$_3$ (64K) | SIZE$_4$ |

FIG. 7B

METHOD FOR FLASHING A READ ONLY MEMORY (ROM) CHIP OF A HOST ADAPTER WITH UPDATED OPTION ROM BIOS CODE

BACKGROUND OF THE INVENTION

1. Field of the Invention

This invention relates generally to computers systems, and more particularly to the updating of computer code implemented to boot up a computer system.

2. Description of the Related Art

Today's personal computer systems provide users with a high degree of flexibility in terms of the number of peripheral devices that may be connected to a given system. For instance, users are able to connect additional internal and external peripheral devices to meet the storage or data access demands required to complete the user's job. Such peripheral devices can include internal or external hard drives, compact disc (CD) players, digital video disc (DVD) players, compact disc recordables (CD-Rs), etc.

To meet the connection needs for these peripheral devices, most computers have IDE connectors and PCI connectors built into the computer's motherboard. Typically, the IDE connectors are used to connect internal devices, such as, hard drives and CD-ROM drives. The PCI connectors are generally configured to receive host adapter cards, which allow the connection of both internal and external devices. As is well known, there are numerous types of host adapters, some of the most commonly used are SCSI host adapters, redundant array of inexpensive disk (RAID) host adapters, and the like. SCSI host adapters are one of the most popular adapters due to peripheral device arrangement flexibility and performance. For instance, one SCSI host adapter can serve as the communication link for up to 15 internal and external peripheral devices.

Most host adapters have option ROM chips integrated onto the printed circuit board of the host adapter card. The option ROM chip is typically an electrically erasable programmable read only memory (EEPROM), which stores program instructions that are used during the boot process of the computer system that has the host adapter card connected thereto. Without these program instructions, the host adapter card and any of the peripheral devices connected to the host adapter card will not be able to communicate with the host computer system, and thus, will be rendered useless. From time to time, the manufacturers of these host adapters find it useful to update the program instructions that are resident in the option ROM chips. Unfortunately, because more than one host adapter card may be connected to a particular computer system, this updating can become problematic in view of the limited space available in the system RAM for this function.

To further elaborate on this problem, it is useful to generally understand the booting process of a computer system having PCI host adapters connected thereto. During bootup, the system BIOS will assign each PCI host adapter to certain memory space in the system RAM. This memory space is used to enable the computer's operating system to communicate with particular registers that are resident on the PCI host adapter card. In general, the system RAM will ask each host adapter to identify how much RAM memory space it needs, and then, that space is allocated. It should be noted that there is only a fixed range of memory space that can be used for PCI devices. A further complication is that different computer manufacturers utilize different system BIOS, which allocate the available RAM memory space in different ways. Accordingly, the memory address location allocated for a given PCI device by one system BIOS may well be different if it is allocated by a system BIOS of another manufacturer.

In order to effectuate an update of the program instructions of a given option ROM chip, the host adapter containing the desired option ROM chip is identified. To update these program instructions, the entire contents of the program instructions also have to be written to the system RAM, in the same location that was previously allocated for the host adapter. Because program instruction updates continue to provide added functionality or operate to fix errors in existing code, the size of the update can be quite large. The problem here is, that the new code may be of a size that it may require memory space that is already occupied by other PCI devices. When this occurs, the update will not be made because there will be no space available in the system RAM. As can be appreciated, there are many reasons why there is a need to update the code in option ROMs, and if this updating is not possible, the computer user can lose some or fail to utilize all of the functionality provided by the peripheral devices that are connected to the host adapter.

In view of the foregoing, there is a need for a method and computer code utility for programming code updates into option ROM chips of host adapters.

SUMMARY OF THE INVENTION

Broadly speaking, the present invention fills these needs by providing a computer implemented method for programming option ROM chips with updated code utilizing a free space memory allocation utility. The free space memory allocation utility is configured to intelligently redirect start address of memory space previously allocated by other host adapters which lie in memory space needed by the updated code. Once the updated code is flashed to the desired option ROM chip, the redirected start address are restored. It should be appreciated that the present invention can be implemented in numerous ways, including as a process, an apparatus, a system, computer readable media, or a device. Several inventive embodiments of the present invention are described below.

In one embodiment, a programming method for flashing a read only memory (ROM) chip of a host adapter with an updated BIOS code is disclosed. The host adapter is connected to a host computer system. The method includes building a table having start address information and memory size information of memory space occupied in the random access memory (RAM) of the host computer system by one or more PCI host adapters which are connected to the computer system via a PCI bus. The method then moves to identifying a selected PCI host adapter having a ROM chip. A desired amount of memory space for an updated option ROM code is then mapped between the RAM of the host computer system and the ROM chip. Now, a start address in RAM of an additional PCI host adapter that is determined to lie within the desired amount of memory space is redirected. Preferably, the redirection is temporarily made to zero. The method now moves to loading the updated option ROM code into the desired amount of memory space in RAM and in the ROM chip of the selected host adapter. In this preferred embodiment, the method also includes restoring the start address in RAM of the additional PCI host adapter after the loading of the updated option ROM code is complete. If there is more than one host adapter occupying space in the desired amount of memory space, each of the start addresses of those host adapters is also temporarily redirected to zero while the loading is performed.

In another embodiment, a method for programming a read only memory (ROM) chip of a host adapter that is connected to a computer system is disclosed. The method includes: (a) scanning for PCI host adapters that are connected to the computer system; (b) building a table having start address information and memory size information of memory space occupied in random access memory (RAM) by the PCI host adapters; (c) identifying a selected PCI host adapter having a ROM chip that is configured to be programmed with an updated option ROM code, such that the selected PCI host adapter is associated with a selected start address and a selected memory size; (d) mapping a desired amount of memory space for the updated option ROM code from RAM to the ROM chip; (e) identifying ones of the PCI host adapters having memory space in RAM in the desired amount of space beginning with the selected start address and extending for an update memory size; (f) redirecting start addresses of the ones of the PCI host adapters lying within the desired amount of space in RAM; and (g) loading the updated option ROM code into the desired amount of space in RAM and into the ROM chip.

In still a further embodiment, programming utility having program instructions for flashing a read only memory (ROM) chip of a host adapter with an updated BIOS code is disclosed. The host adapter is connected to a host computer system. The programming utility includes: (a) program instructions for building a table having start address information and memory size information of memory space occupied in the random access memory (RAM) of the host computer system by one or more PCI host adapters which are connected to the computer system via a PCI bus; (b) program instructions for identifying a selected PCI host adapter having a ROM chip; (c) program instructions for mapping a desired amount of memory space for an updated option ROM code between the RAM of the host computer system and the ROM chip; (d) program instructions for redirecting a start address in RAM of an additional PCI host adapter that is within the desired amount of memory space; and (e) program instructions for loading the updated option ROM code into the desired amount of memory space in RAM and in the ROM chip of the selected host adapter. Preferably, the utility also includes program instructions for restoring the start address in RAM of the additional PCI host adapter after the loading of the updated option ROM code is complete.

In yet another embodiment, a method for flashing a read only memory (ROM) chip with an updated BIOS code is disclosed. The method includes: (a) building a table having start address information and memory size information of memory space occupied in a random access memory (RAM) of a host computer system by one or more host adapters which are connected to the host computer system; (b) identifying a selected host adapter having a ROM chip; (c) mapping a desired amount of memory space for an updated option ROM code between the RAM of the host computer system and the ROM chip; (d) redirecting a start address in RAM of an additional host adapter that is within the desired amount of memory space; and (e) loading the updated option ROM code into the desired amount of memory space in RAM and in the ROM chip of the selected host adapter.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 7A and 7B illustrate tables having allocated memory starting addresses and sizes for host adapters, in accordance with one embodiment of the present invention.

DETAILED DESCRIPTION OF THE PREFERRED EMBODIMENTS

An invention is described for a computer implemented method for programming option ROM chips with updated code utilizing a free space memory allocation utility. The free space memory allocation utility is configured to intelligently redirect start address of memory space previously allocated by other host adapters which lie in memory space needed by the updated code. Once the updated code is flashed to the desired option ROM chip, the redirected start address are restored. It will be obvious, however, to one skilled in the art, that the present invention may be practiced without some or all of these specific details. In other instances, well known process operations have not been described in detail in order not to unnecessarily obscure the present invention.

As an overview, the option ROM BIOS programming utility of the present invention is configured to scan all PCI devices in the system and obtain their allocated PCI memory ranges. From this information, it is possible to determine if there will be enough memory space available for the updated option ROM code without clashing with other PCI devices. If it is determined that a clash will occur, then memory access with the clashing PCI devices will be temporarily disabled by re-mapping the base address registers. When the update has been flashed to the option ROM chip and the intelligently allocated memory space in RAM, the base address registers of the clashing PCI devices will be restored to the pre-re-mapping state, and the system will go back to normal operation. FIGS. 1A through 7B will now be described to more fully describe the details of the present invention.

Figure 1A:
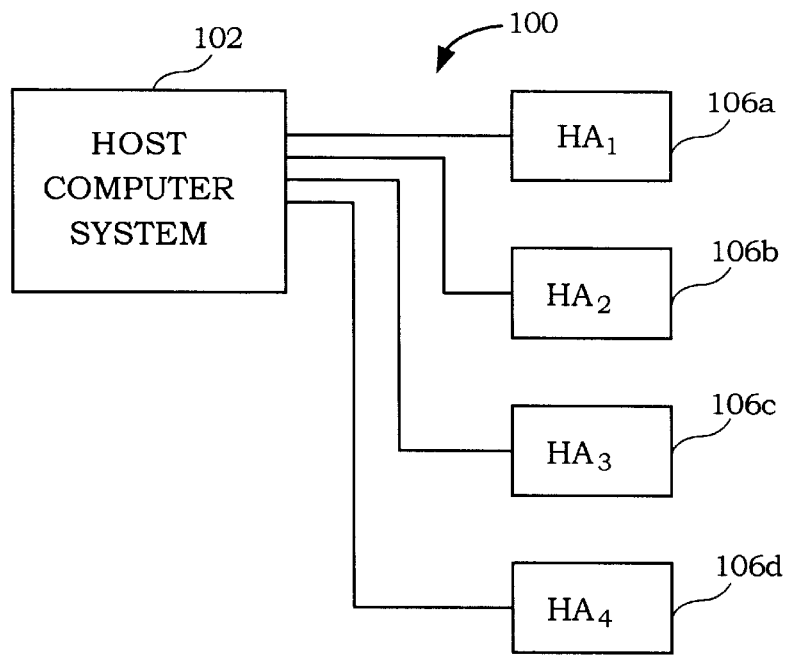
FIG. 1A shows a block diagram of a host computer system having a plurality of host adapters connected thereto.

FIG. 1A shows a block diagram 100 of a host computer system 102 having a plurality of host adapters 106 connected thereto. In general, the host computer system 102 typically has a plurality of PCI connectors built into the motherboard to allow different types of host adapters to be connected to a PCI bus of the host computer system. In this example, a host adapter (HA$_1$) 106a, a host adapter (HA$_2$) 106b, a host adapter (HA$_3$) 106c, and a host adapter (HA$_4$) 106d are connected to the host computer system 102.

Figure 1B:
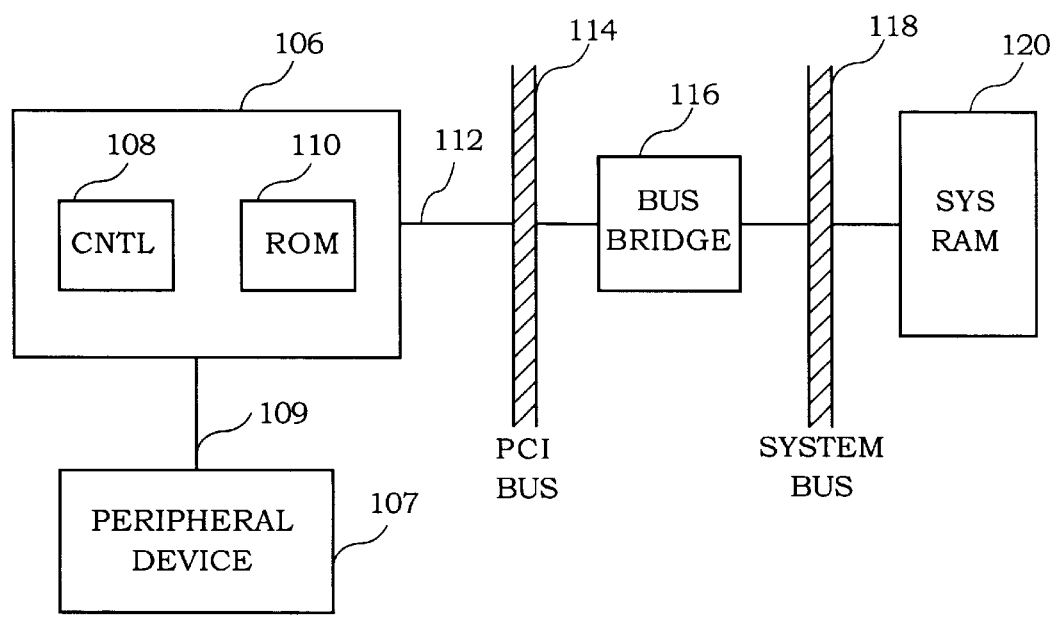
FIG. 1B illustrates a more detailed view of a host adapter card being connected to a PCI bus, and communicating with a system bus and RAM.

Each of the host adapters 106 typically has a controller chip 108, and a ROM chip 110 integrated to the printed circuit board of the host adapter. Of course, the host adapter card 106 will also include other supporting circuitry that will enable appropriate execution and communication with the host computer system 102. As shown in FIG. 1B, the host adapter 106 can be a SCSI host adapter that can provide appropriate communication for one or more peripheral devices 107, which may be SCSI peripheral devices. The peripheral device 107 communicates via an appropriate link 109, which may be an internal ribbon connection or an external cable. The host adapter 106 is shown connected to a PCI bus 114 via a PCI connector 112. The PCI bus 114 typically communicates through a bus bridge 116 to the system bus 118 of the host computer system 102. The system bus 118 also provides a communication path to the system RAM 120.

During the boot-up process of the host computer system 102, the system BIOS is configured to initialize each of the host adapters 106 to enable appropriate communication between the host computer system 102 and associate peripheral devices 107. To effectuate the initialization, the system BIOS will allocate a certain amount of communication memory space in the system RAM 102 for each of the host adapter cards 106a.

Figure 2:
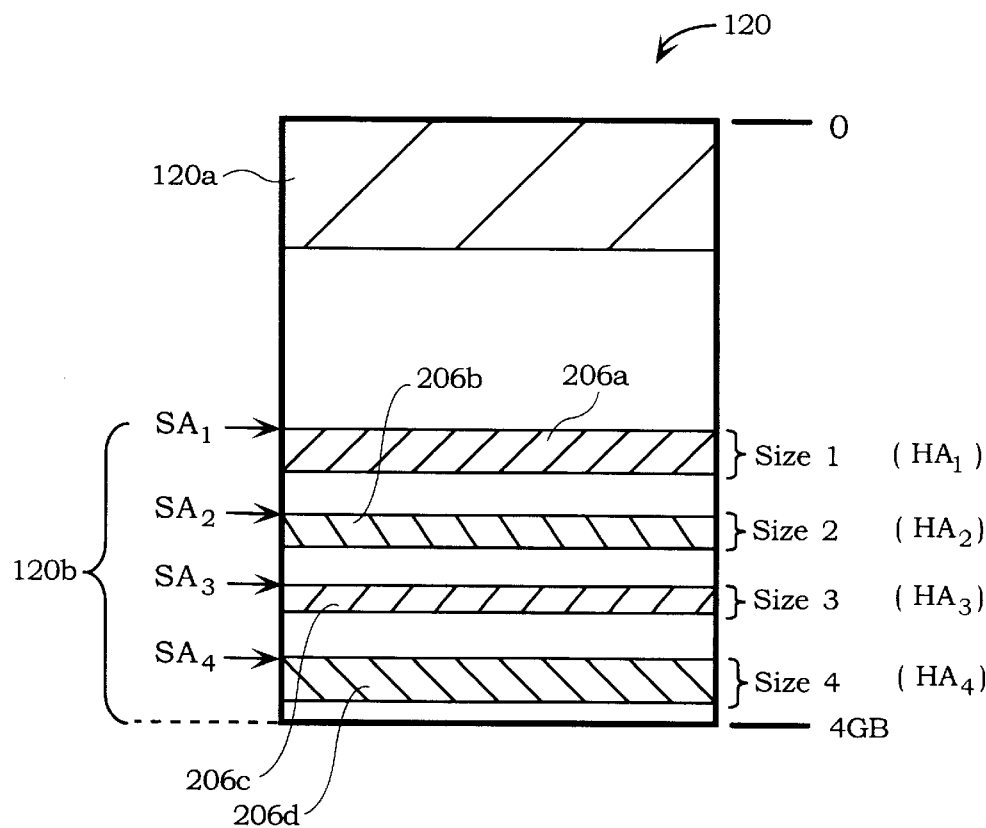
FIG. 2 illustrates a more detailed diagram of a system RAM having allocated memory space, in accordance with one embodiment of the present invention.

FIG. 2 illustrates a more detailed diagram of the system RAM 120, in accordance with one embodiment of the present invention. As shown, the system RAM 120 utilizes different address ranges for processing different tasks. For instance, memory space 120a is typically used for operating system (OS) programs and operating system files. An address range 120b is typically used for the various host adapters 106 that may be connected to the host computer system 102.

In general, during the initialization by the system BIOS, the system BIOS will allocate a certain amount of memory space in the system RAM 120 to establish communication with the register chip set on each of the host adapters. This memory space will therefore allow the operating system (OS) to communicate with the host adapters connected to the host computer system 102.

In more detail, the address range 120b shows four distinct address ranges 206a, 206b, 206c, and 206d for the host adapters HA$_1$, HA$_2$, HA$_3$, and HA$_4$, respectively. Each of the address ranges will have an associated start address, which are shown as SA$_1$, SA$_2$, SA$_3$, and SA$_4$. The address ranges 206 will also have an associated size parameter, which are shown as SIZE$_1$, SIZE$_2$, SIZE$_3$, and SIZE$_4$.

As mentioned above, the actual allocated location space within the address range 120b for each of the host adapters will vary depending upon the particular system BIOS that is initializing the host adapters 106. That is, different system BIOS manufacturers will have different ways of allocating this memory space. Accordingly, the actual address ranges 206 for each of the host adapters 106 will vary in different systems.

Figure 3:
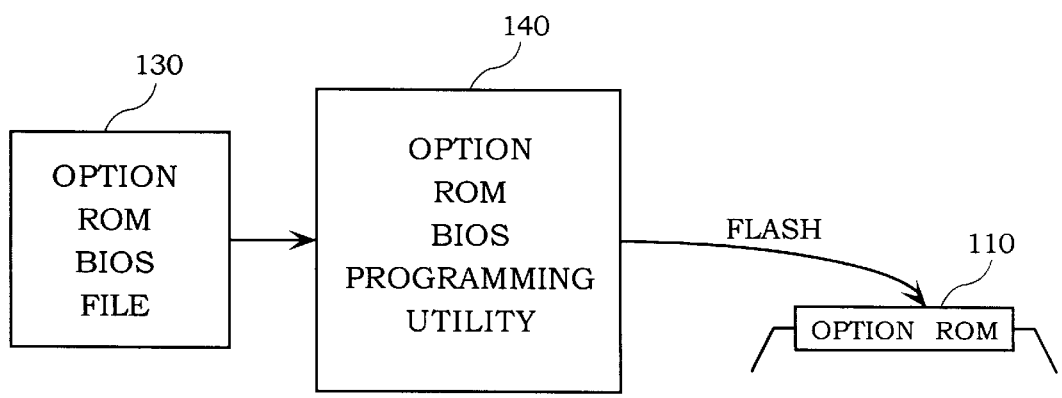
FIG. 3 illustrates a simplified block diagram of an updating operation of the option ROM BIOS code resident on one of the ROM chips of a host adapter, in accordance with one embodiment of the present invention.

FIG. 3 illustrates a simplified block diagram of an updating operating of the option ROM BIOS code resident on one of the ROM chips 110 of a host adapter 106. For instance, it may be necessary to update the BIOS program resident on in one of the ROM chips 110 of a host adapter 106. To accomplish this, the user will typically obtain an updated option ROM BIOS file 130 that needs to be programmed into an existing option ROM chip 110 of one of the host adapter 106. As such, the ROM chips 110 are programmable chips, such as electrically erasable programmable read only memories (EEPROMs) that can be flashed with a new updated program.

In this preferred embodiment, the option ROM BIOS file 130 is flashed into the option ROM chip 110 using an option ROM BIOS program utility 140. The option ROM BIOS programming utility 140 is configured to allow the flashing of the updated option ROM BIOS file 130 into the option ROM 110 even in situations where there is not enough space the system RAM 120. In general, the option ROM BIOS program utility 140 will be configured to dynamically and intelligently allocate enough memory space in the system RAM 120 regardless of the number of host adapters 106 that have previously been allocated memory space in the memory space 120b of the system RAM 120.

By way of example, if the updated option ROM BIOS file is about 64K in size, and the update is mapped to the option ROM chip 110 of the host adapter HA$_3$, the system BIOS will need to write the 64K of the update in a location that begins at the starting address SA$_3$ (i.e., SA$_3$ is associated with the starting address of host adapter HA$_3$). However, the size of the update is larger than the size of the current allocated memory space in address range 206c. In this example, the new address range will occupy an address range 206c'. When this occurs, the amount of memory space required for the update in the system RAM 120 will overlap the area which is occupied by the address range 206d and is associated with the host adapter HA$_4$. This will, of course cause a conflict that can have the potential of crashing or hanging-up the computer system.

In order to intelligently allocate memory space for the updated option ROM BIOS file 130, the option ROM BIOS program utility 140 is configured to redirect the starting address of the host adapter HA$_4$ for a period of time that allows writing of the entire update in the address range 206c'. At about the same time the update is written to the system RAM 120, the update will also be flashed to the option ROM 110, via a mapping operation. The option ROM BIOS programming utility 104, therefore assists in performing the redirection of the starting address of any address ranges 206 associated with host adapters that may be in the range of the update. Accordingly, although this example only illustrates a case where one address range is conflicting, in cases where the system RAM is more crowded, all starting addresses of conflicting address ranges will be temporarily redirected. Preferably, the starting addresses are temporarily redirected to zero.

Figure 5:
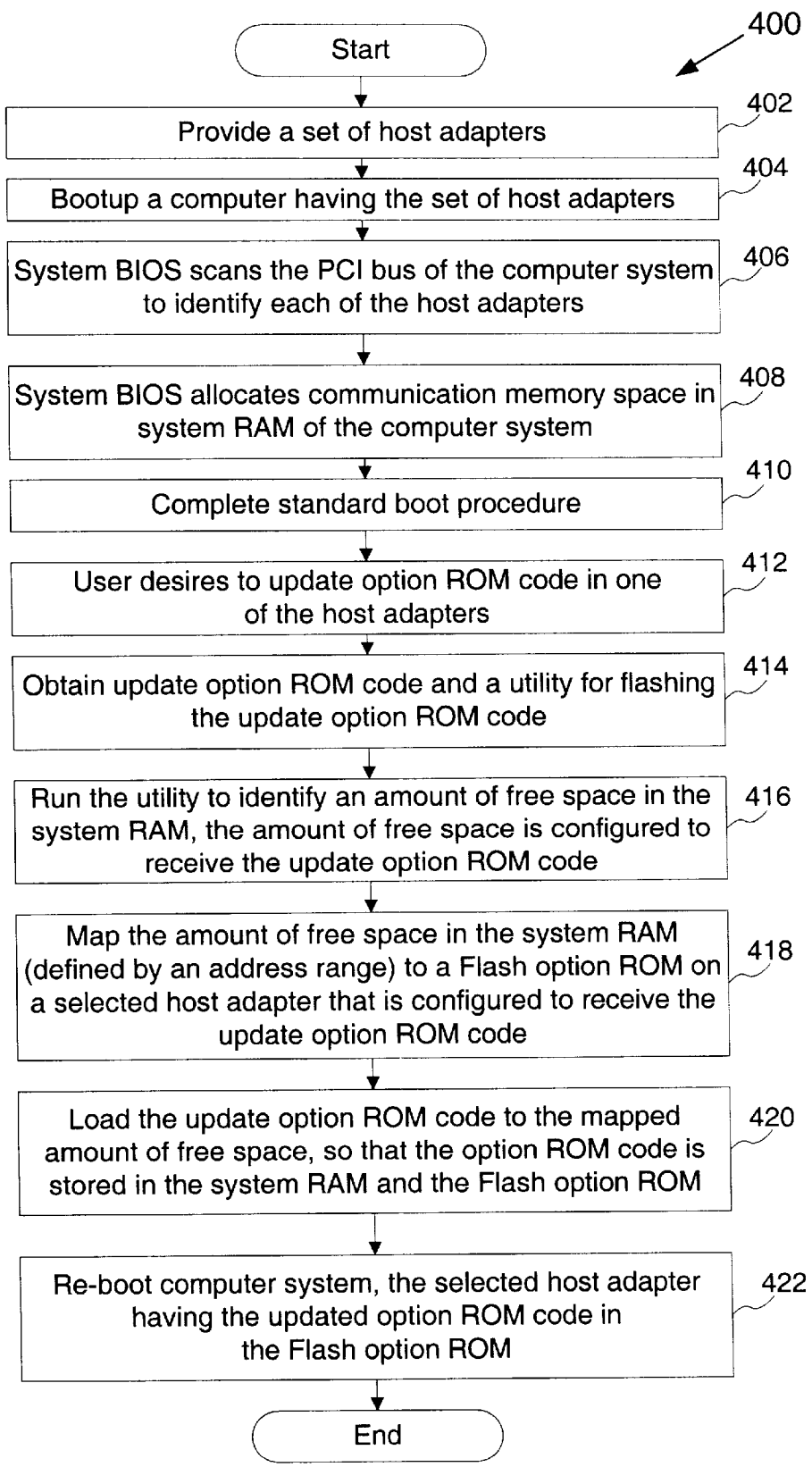
FIG. 5 illustrates a flowchart that describes the method operations of updating the option ROM BIOS of a selected option ROM chip, in accordance with one embodiment of the present invention.

FIG. 5 illustrates a flowchart 400 that describes the method operations of updating the option ROM BIOS of a selected option ROM chip 110, in accordance with one embodiment of the present invention. The method begins at an operation 402 where a set of host adapters are provided. In general, a host computer system 102 can have a number of host adapters, each of which are connected to the motherboard of the host computer system 102, via a PCI bus, for example. Once a set of host adapters are provided in operation 402, the method advances to an operation 404 where the host computer system is booted up.

Now the method moves to operation 406 where the system BIOS will scan the PCI bus of the host computer system to identify each of the host adapters that are part of the provided set of host adapters. The method then advances to operation 408 where the system BIOS allocates communication memory space (i.e., address ranges 206), in the system RAM of the host computer system. As mentioned above, the actual location of the address ranges associated with the communication memory space will be different depending upon the manufacturer of the system BIOS. The standard boot procedure is then complete at operation 410 and the method proceeds to an operation 412 where the user may desire to update the option ROM code in one of the host adapters.

Figure 4:
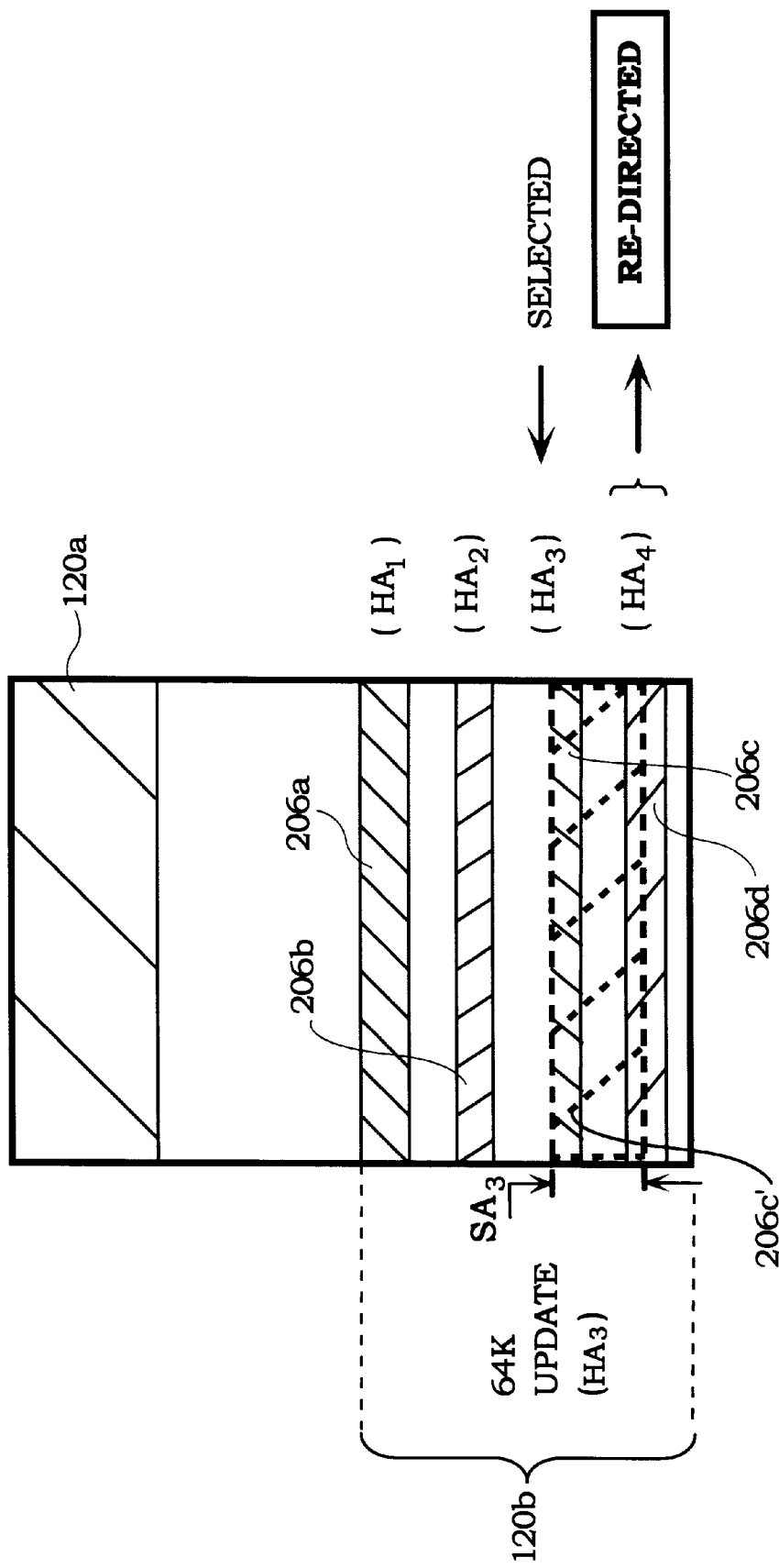
FIG. 4 illustrates another example of the system RAM having allocated memory space, in accordance with one embodiment of the present invention.

In the example of FIG. 4, suppose that host adapter $HA_3$ is selected to have its option ROM code updated. Once the user selects the desired option ROM chip 110 of host adapter $HA_3$, the method proceeds to operation 414 where an update option ROM code and a utility for flashing the updated option ROM code is obtained. By way of example, the updated option ROM code and the utility for flashing the updated option ROM code can be obtained by way of a floppy disk, a CD-ROM, over a computer network, or over the Internet. Once the desired updated option ROM code and the utility for flashing the updated option ROM code are obtained, the method will move to an operation 416 where the utility is run to dynamically identify an amount of free space in the system RAM.

In this embodiment, the amount of free space is configured to receive the update option ROM code. The method now advances to an operation 418 where the amount of free space in the system RAM is mapped to the option ROM chip (e.g., flash option ROM chip) on the selected host adapter that is configured to receive the updated option ROM code. Now, the method will move to an operation 420 where the updated option ROM code is loaded to the mapped amount of free space, so that the option ROM code is stored in both the system RAM and the option ROM chip of the desired host adapter. Once the update has been loaded, the method will advance to an operation 422 where the computer system is preferably rebooted so that the selected host adapter can operate implementing its updated option ROM code.

Figure 6:
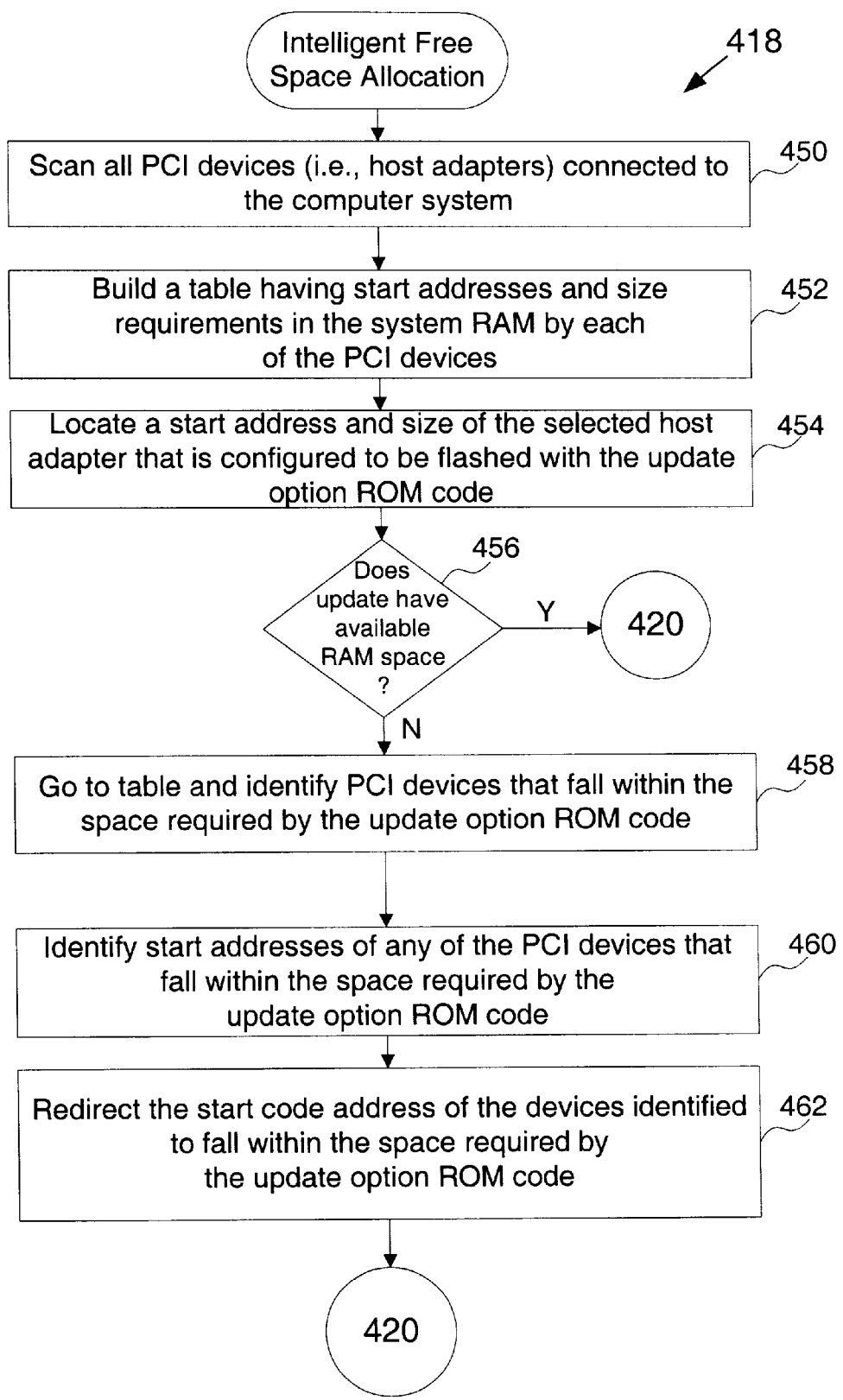
FIG. 6 illustrates in more detail the intelligent free space allocation performed during an operation of FIG. 5, in accordance with one embodiment of the present invention.

FIG. 6 illustrates in more detail the intelligent free space allocation performed during operation 418 of FIG. 5, in accordance with one embodiment of the present invention. As mentioned above, because updates of the option ROM code are many times going to be larger than the allocated communication memory space 206, there is a good chance that the address range necessary for the update in the system RAM 120 will already have been taken up by another host adapter. Accordingly, the intelligent free space allocation of the present invention begins at an operation 450, where all PCI devices (i.e., host adapters) that are connected to the computer system are scanned.

After the scanning is complete, a table having start addresses and size requirements in the system RAM for each of the PCI devices is created in operation 452. For instance, FIG. 7A illustrates an example where four host adapters $HA_1$ through $HA_4$ have been scanned and each will have an associated start address $SA_1$ through $SA_4$, as well as size requirements $SIZE_1$ through $SIZE_4$. After this table has been built in operation 452, the method will proceed to an operation 454 where a start address and size of the selected host adapter that is configured to be flashed with the updated option ROM code is located. In this example, host adapter $HA_3$ is the selected host adapter, and it will have an associated start address $SA_3$ and a $SIZE_3$ (i.e., an address range). At this point, the method will proceed to a decision operation 456 where it is determined whether the update has available RAM space beginning with start address $SA_3$.

In the example of FIG. 4, it is evident that the address range 206c' does not have enough free space available for the updated option ROM code. As such, the method will proceed to an operation 458 where reference is made to the table built in operation 452 in order to identify the PCI devices that fall within the space required by the update option ROM code. Once again, in FIG. 4, host adapter $HA_4$ is taking up communication memory space starting at start address $SA_4$. Accordingly, the method will proceed to an operation 460 where the start addresses of any of the PCI devices that fall within the space required by the updated option ROM code are identified.

At this point, the start code address of the devices that were identified to fall within the space required by the updated option ROM code are redirected. By way of example, FIG. 7B illustrates the table 302 in which the start address of host adapter $HA_4$ is set to zero so that the updated option ROM code can be written beginning at start address $SA_3$. In one particular example, the updated option ROM code may be 64K, and all 64K will now be able to be written to the system RAM 120 as well as the option ROM chip 110 in accordance with the mapped amount of free space as described with reference to operation 420.

On the other hand, if it was determined in operation 456 that there is available space in the system RAM for the updated option ROM BIOS code, then the method would directly move to operation 420 from decision operation 456. In the same manner, when the updated option ROM code is loaded, that same option ROM code will be written (i.e., mapped) to both the system RAM 120 and the option ROM chip 110. After the updated option ROM code has been appropriately loaded to the mapped amount of free space to both the system RAM 120 and the option ROM chip 110, the option ROM BIOS program utility 140 will restore the start addresses of the host adapters that were conflicting with the updated option ROM code memory space range.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A programming method for flashing a read only memory (ROM) chip of a host adapter with an updated option ROM BIOS code, the host adapter being connected to a host computer system, the method comprising:

building a table having start address information and memory size information of memory space occupied in random access memory (RAM) of the host computer system by one or more PCI host adapters which are connected to the host computer system via a PCI bus;

identifying a selected PCI host adapter having a ROM chip;

mapping a desired amount of memory space for the updated option ROM BIOS code from the RAM of the host computer system to the ROM chip;

redirecting a start address of an additional PCI host adapter that is within the desired amount of memory space; and loading the updated option ROM code into the desired amount of memory space in the RAM and in the ROM chip of the selected host adapter.

2. A programming method for flashing a read only memory (ROM) chip as recited in claim 1, further comprising:

restoring the start address in RAM of the additional PCI host adapter after the loading of the updated option ROM BIOS code is complete.

3. A programming method for flashing a read only memory (ROM) chip as recited in claim 1, wherein before the redirecting is performed, the method further includes:

referring to the table to find start addresses that fall within the desired amount of memory space.

4. A programming method for flashing a read only memory (ROM) chip as recited in claim 3, wherein the desired amount of memory space begins at a start address of memory space in RAM that is used by the selected PCI host adapter.

5. A programming method for flashing a read only memory (ROM) chip as recited in claim 4, wherein the desired amount of memory space has a size necessary to fit the updated option ROM BIOS code, and the updated option ROM BIOS code is loaded beginning at the start address.

6. A programming method for flashing a read only memory (ROM) chip as recited in claim 1, wherein the redirecting is made to a temporary start address of zero.

7. A programming method for flashing a read only memory (ROM) chip as recited in claim 1, wherein the option ROM chip is an electrically erasable programmable read only memory (EEPROM) that can be flashed with the updated option ROM BIOS code during the loading.

8. A programming method for flashing a read only memory (ROM) chip as recited in claim 1, wherein the one or more PCI host adapters can include a SCSI host adapter and a redundant array of inexpensive disk (RAID) host adapter.

9. A method for programming a read only memory (ROM) chip of a host adapter that is connected to a computer system, comprising:

scanning for PCI host adapters being connected to the computer system;

building a table having start address information and memory size information of memory space occupied in random access memory (RAM) by the PCI host adapters that are connected to the computer system;

identifying a selected PCI host adapter having a ROM chip that is configured to be programmed with an updated option ROM BIOS code, the selected PCI host adapter being associated with a selected start address and a selected memory size;

mapping a desired amount of memory space for the updated option ROM BIOS code from RAM to the ROM chip;

identifying ones of the PCI host adapters having memory space in RAM in the desired amount of space beginning with the selected start address and extending for an update memory size;

re-directing start addresses of the ones of the PCI host adapters lying within the desired amount of space in RAM; and loading the updated option ROM BIOS code into the desired amount of space in RAM and into the ROM chip.

10. A method for programming a read only memory (ROM) chip of a host adapter that is connected to a computer system as recited in claim 9, further comprising:

determining when the loading of the updated option ROM BIOS code is complete; and when the loading is complete, restoring the start addresses of the ones of the PCI host adapters lying within the desired amount of space in RAM back to a state that is before the re-directing.

11. A method for programming a read only memory (ROM) chip of a host adapter that is connected to a computer system as recited in claim 9, wherein the re-directing is performed for a temporary amount of time that is needed to complete the loading.

12. A method for programming a read only memory (ROM) chip of a host adapter that is connected to a computer system as recited in claim 9, wherein the option ROM chip is an electrically erasable programmable read only memory (EFPROM) that can be flashed with the updated option ROM BIOS code during the loading.

13. A method for programming a read only memory (ROM) chip of a host adapter that is connected to a computer system as recited in claim 9, wherein re-directing start addresses of the ones of the PCI host adapters lying within the desired amount of space in RAM comprises:

setting the start addresses to zero.

14. A method for programming a read only memory (ROM) chip of a host adapter that is connected to a computer system as recited in claim 9, identifying ones of the PCI host adapters having memory space in RAM in the desired amount of space further comprises:

referring to the table to ascertain if any of the PCI host adapters connected to the computer system have start addresses that lie within the desired amount of space.

15. A method for programming a read only memory (ROM) chip of a host adapter that is connected to a computer system as recited in claim 9, wherein the PCI host adapters can include a SCSI host adapter and a redundant array of inexpensive disk (RAID) host adapter.

16. A method for programming a read only memory (ROM) chip of a host adapter that is connected to a computer system as recited in claim 9, wherein the method of programming the ROM chip is part of a programming utility program.

17. A programming utility for execution on a computer having program instructions for flashing a read only memory (ROM) chip of a host adapter with an updated option ROM BIOS code, the host adapter being connected to a host computer system, the programming utility comprising:

program instructions for building a table having start address information and memory size information of memory space occupied in the random access memory (RAM) of the host computer system by one or more PCI host adapters which are connected to the host computer system via a PCI bus;

program instructions for identifying a selected PCI host adapter having a ROM chip;

program instructions for mapping a desired amount of memory space for an updated option ROM BIOS code from the RAM of the host computer system to the ROM chip;

program instructions for redirecting a start address in RAM of an additional PCI host adapter that is within the desired amount of memory space; and program instructions for loading the updated option ROM BIOS code into the desired amount of memory space in RAM and in the ROM chip of the selected host adapter.

18. A programming utility for execution on a computer having program instructions for flashing a read only memory (ROM) chip of a host adapter with an updated option ROM BIOS code as recited in claim 17, further comprising:

program instructions for restoring the start address in RAM of the additional PCI host adapter after the loading of the updated option ROM BIOS code is complete.

19. A programming utility for execution on a computer having program instructions for flashing a read only memory (ROM) chip of a host adapter with an updated option ROM BIOS code as recited in claim 17, wherein before executing the program instructions for redirecting, the utility further includes:

program instructions for referring to the table to find start addresses that fall within the desired amount of memory space.

20. A programming utility for execution on a computer having program instructions for flashing a read only memory (ROM) chip of a host adapter with an updated option ROM BIOS code as recited in claim 19, wherein the desired amount of memory space begins at a start address of memory space in RAM that is used by the selected PCI host adapter.

21. A programming utility for execution on a computer having program instructions for flashing a read only memory (ROM) chip of a host adapter with an updated option ROM BIOS code as recited in claim 20, wherein the desired amount of memory space has a size necessary to fit the updated option ROM BIOS code, and the updated option ROM BIOS code is loaded beginning at the start address.

22. A programming utility for execution on a computer having program instructions for flashing a read only memory (ROM) chip of a host adapter with an updated option ROM BIOS code as recited in claim 17, wherein the redirecting is made to a temporary start address of zero.

23. A programming utility for execution on a computer having program instructions for flashing a read only memory (ROM) chip of a host adapter with an updated option ROM BIOS code as recited in claim 17, wherein the programming utility is embodied in a computer readable media.

24. A method for flashing a read only memory (ROM) chip with an updated option ROM BIOS code, the method comprising:

building a table having start address information and memory size information of memory space occupied in a random access memory (RAM) of a host computer system by one or more host adapters which are connected to the host computer system;

identifying a selected host adapter having a ROM chip;

mapping a desired amount of memory space for the updated option ROM BIOS code from the RAM of the host computer system to the ROM chip;

redirecting a start address of an additional host adapter that is within the desired amount of memory space; and loading the updated option ROM BIOS code into the desired amount of memory space in the RAM and in the ROM chip of the selected host adapter.

25. A method for flashing a read only memory (ROM) chip as recited in claim 24, further comprising:

restoring the start address in RAM of the additional host adapter after the loading of the updated option ROM BIOS code is complete.

* * * * *